United States Patent [19]

Shiraishi et al.

[11] Patent Number: 4,981,296
[45] Date of Patent: Jan. 1, 1991

[54] DATA PROCESSING MACHINE WITH INTERRUPT CONTROL FOR VARYING PROCESSING SPEED

[75] Inventors: Tomikatsu Shiraishi, Nara; Hiroshi Maeda, Yamatokoriyama, both of Japan

[73] Assignee: Sharp Kabushiki Kaisha, Osaka, Japan

[21] Appl. No.: 244,569

[22] Filed: Sep. 12, 1988

Related U.S. Application Data

[63] Continuation of Ser. No. 887,935, Jul. 22, 1986, abandoned.

[30] Foreign Application Priority Data

Jul. 22, 1985 [JP] Japan .............................. 60-163222

[51] Int. Cl.⁵ .......................... G06F 13/00; A63F 9/22
[52] U.S. Cl. .................... 273/1 E; 273/85 G; 273/DIG. 28; 364/200; 364/270.3
[58] Field of Search ............ 273/1 E, 16 C, 16 E, 273/85 G, DIG. 28; 364/200 MSI File, 900 MS File

[56] References Cited

U.S. PATENT DOCUMENTS

| | | | |
|---|---|---|---|
| 3,974,479 | 8/1976 | Kotok et al. | 364/200 |
| 4,434,461 | 2/1984 | Puhl | 364/200 |
| 4,631,702 | 12/1986 | Korba | 364/900 |
| 4,835,681 | 5/1989 | Culley | 364/200 |

OTHER PUBLICATIONS

IBM Technical Disclosure Bulletin, vol. 22, No. 7, Dec., 1979, pp. 2647, 2648, New York, U.S.; J. W. Cannon: "Microcode Timer", page 2648, paragraph 1.
Patents Abstracts of Japan, vol. 6, No. 70 (P-113) [948], 6th May, 1982; JP-A-57 8849 (Fujitsu K.K.) 18-0-1-1982, Abstract.
IBM Technical Disclosure Bulletin, vol. 27, No. 3, Aug., 1984, pp. 1695, 1696, New York, U.S.; M. Dean et al.: "Wait-State Generator", whole document.
IBM Technical Disclosure Bulletin, vol. 25, No. 5, Oct., 1982, p. 2705, New York, U.S.; J. D. Dixon et al.; "Programmable Instruction Cycle Time".

Primary Examiner—Edward M. Coven
Assistant Examiner—Jessica J. Harrison
Attorney, Agent, or Firm—Birch, Stewart, Kolasch & Birch

[57] ABSTRACT

A data processing machine is provided with a microprocessor that functions in response to signals output by a clock oscillator to selectively change the data-processing speed of the microprocessor. The data processing machine contains a circuit for generating interruption signals at specific intervals by dividing the signals output by the clock oscillator, a signal-input device for inputting command signals that cause the microprocessor to change the data-processing speed, and a controller which, in response to signals from the input device, executes a stand-by process each time a specific number of interruption signals generated by the interruption signal generating circuit is received.

2 Claims, 4 Drawing Sheets

DATA PROCESSING MACHINE WITH INTERRUPT CONTROL FOR VARYING PROCESSING SPEED

This application is a continuation, of application Ser. No. 06/887,935 filed on July 22, 1986, now abandoned.

BACKGROUND OF THE INVENTION

The present invention relates to a data processing device provided with a microprocessor that functions in response to signals produced by a clock oscillator to change the data-processing speed of the microprocessor. When a high-speed processor incorporating a microprocessor is used with electronic game software programs that have been designed for use with a low-speed processor, the execution keys are normally unable to operate quickly enough to match the game's movements. Key-input operation cannot be properly executed because the stand-by time for key-input operation is too short. To compensate for this, conventionally, a variety of systems are made available for changing the clock frequency of the microprocessor. However, this makes the hardware rather expensive.

SUMMARY OF THE INVENTION

The present invention thoroughly overcomes the problems mentioned above by providing a novel data processing device which is capable of changing the data-processing speed while stabilizing the operative frequencies of the microprocessor. Briefly speaking, the present invention provides a novel data processing device which is provided with a microprocessor that functions in accordance with signals produced by a clock oscillator to change the data processing speed of the microprocessor. The device is comprised of means for generating interruption signals at constant intervals by dividing the signals output by the clock oscillator; signal input means for inputting command signals that cause the microprocessor to change the data processing speed; and a controller which, in response to signals from said input means, executes a stand-by process each time a specific number of interruption signals generated by said signal generating means is received.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Figure 1:
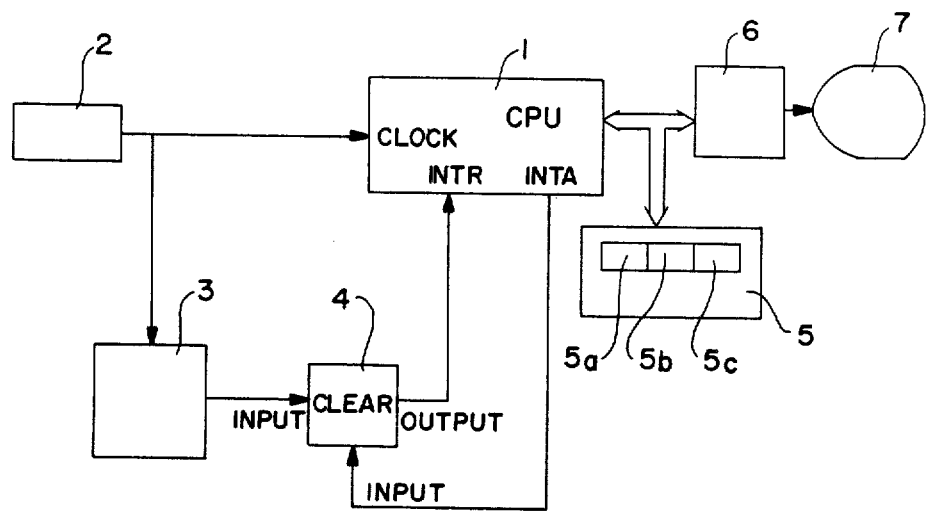
FIG. 1 is a simplified block diagram of the data processing device reflecting one of the preferred embodiments of the present invention.
Figure 2:
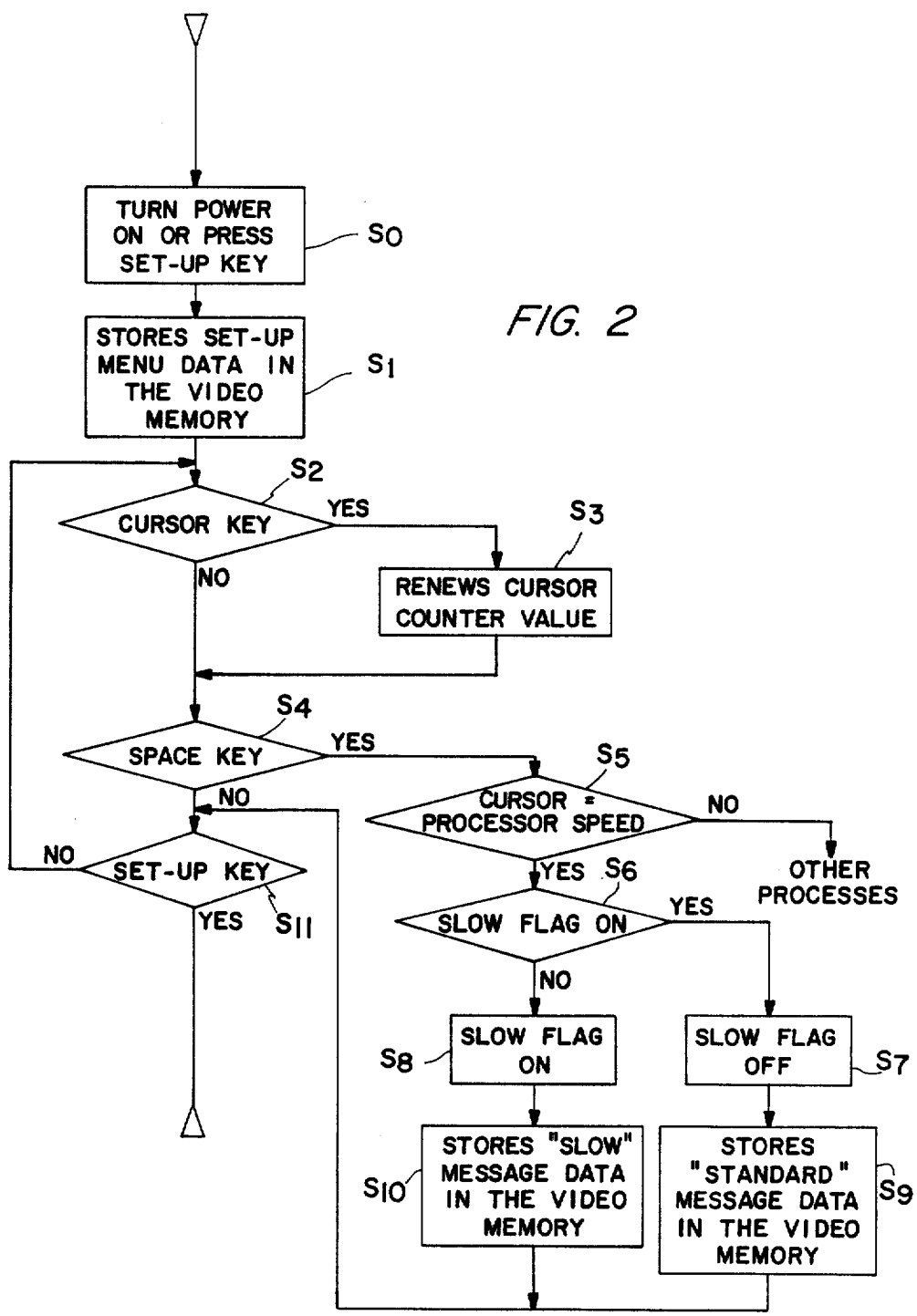
FIGS. 2 and 3 are operation flowcharts denoting the data processing operations of the data processing device related to the present invention.
Figure 3:
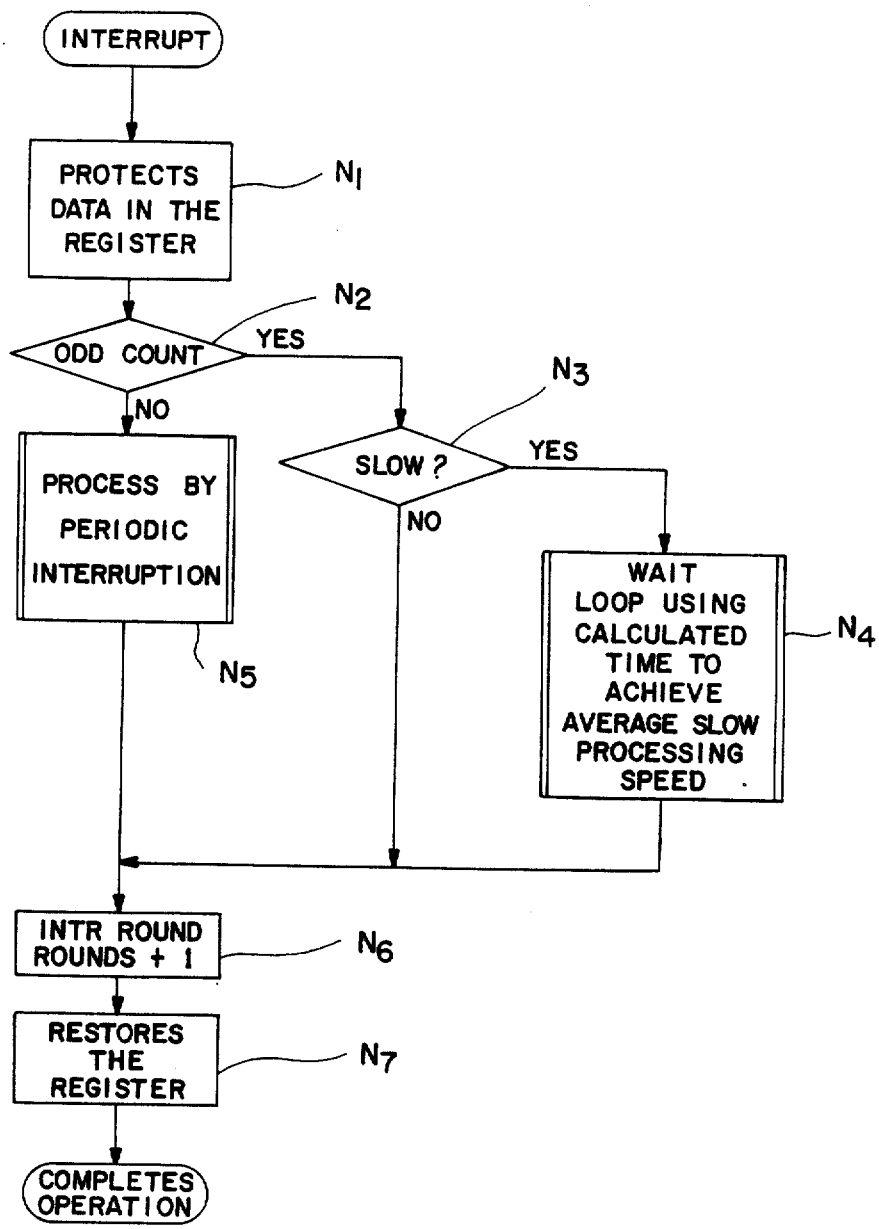

Referring now to the accompanying drawings, one of the preferred embodiments of the present invention is described below. The data processing device reflecting one of the preferred embodiments generates interruption signals at specific intervals by dividing the signals which are output from a clock oscillator to execute a stand-by loop every two interruption signals, thus allowing the microprocessor to reduce its apparent data-processing speed. FIG. 1 is a simplified block diagram of the data processing device reflecting one of the preferred embodiments of the present invention. A main controller unit CPU 1, which is a microprocessor, executes control operations in accordance with sequence programs stored in the read-only memory ROM. Part of the sequence program is shown in FIGS. 2 and 3. The CPU 1 operates on receipt of a clock signal from an oscillator 2. After receiving an interruption signal from a division circuit 3 which divides the frequency of the clock signal by a specific number, the CPU 1 enters an interruption process. The signal from the division circuit 3 is delivered to a latch circuit 4 at specific predetermined intervals. The latch circuit 4 then outputs the interruption signal INTR for delivery to the CPU 1. As soon as the interruption process is selected by the interruption signal INTR, CPU 1 outputs interruption acknowledge signal INTRA to reset the latch circuit 4 and then identifies that the interruption process has been entered. The latch circuit 4 is also made available for other devices to activate the interruption process for CPU 1. A keyboard unit 5 is provided with a variety of data-input keys and function keys. The keyboard unit 5 related to the present invention is provided with a cursor key 5a, a set-up key 5b, and a space key 5c. A video memory 6 stores the display data of the liquid crystal display 7.

Figure 4:
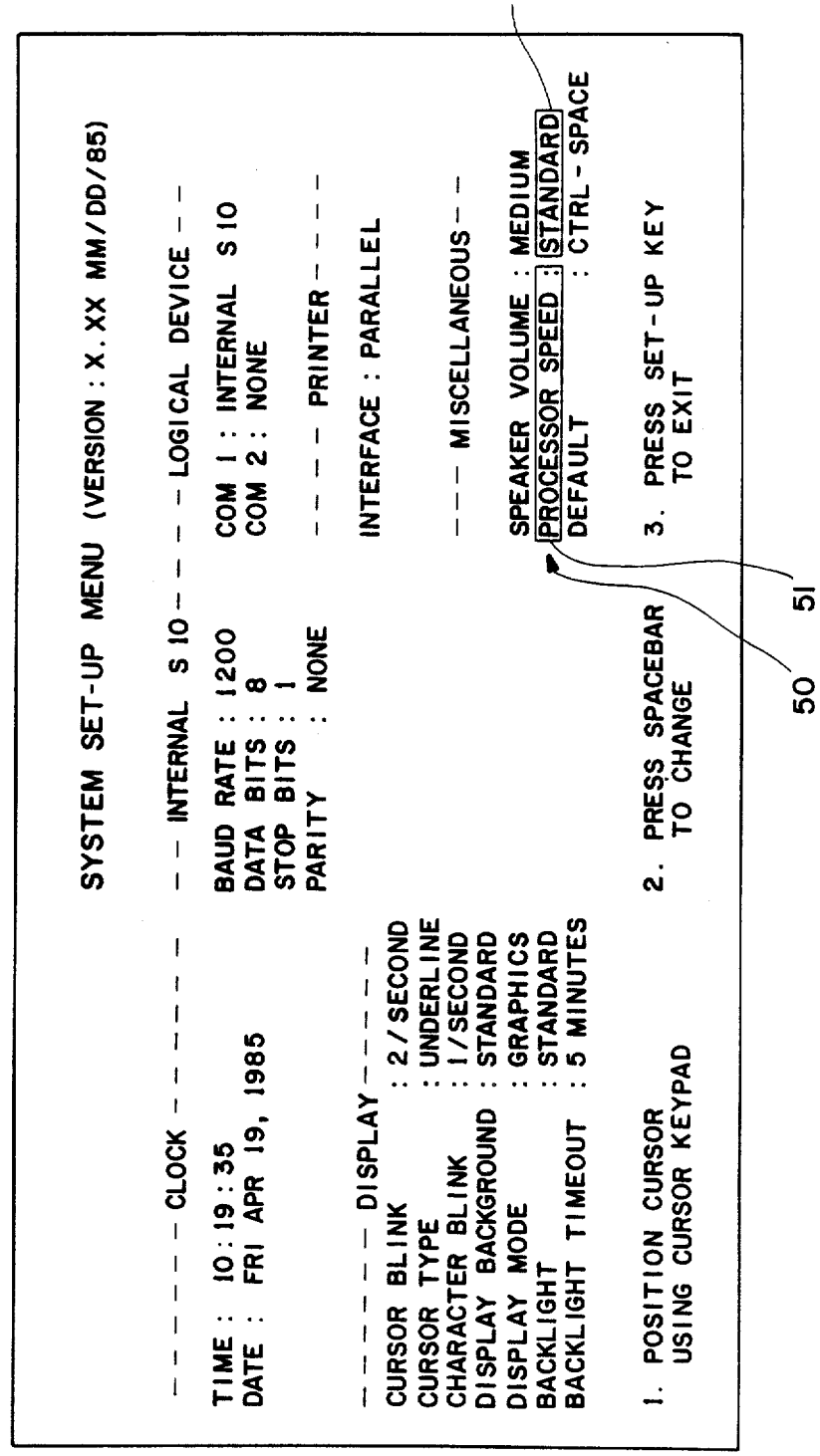
FIG. 4 is a system set-up menu denoting the display contents on the data processing device related to the present invention.

Referring now to FIG. 2, the operation of the data processing device related to the present invention is described below. When the power switch of the data processing device is ON or the operator presses the set-up key 5b (step S0), the set-up menu data predetermined by the sequence program is then stored in a video memory 6, allowing the set-up menu data to appear in a liquid crystal display 7 as shown in FIG. 4 (step S1). By manually operating the cursor key 5a, the operator then causes a cursor mark 50 to move into a processor speed-shifting indication column 51 on the display (step S2). This activates the cursor-counter (not shown) to reset the count at a specific value that matches the cursor position (step S3). Next, when the operator presses the space key 5c (step S4), the CPU 1 determines whether or not the cursor mark is present in the processor speed-shifting indication column 51 (step S5). If the slow flag is ON, the CPU 1 turns it OFF (steps S6 and S7). Conversely, if the slow flag is OFF, the CPU 1 turns it ON (steps S6 through S8). "Slow" or "Standard" message data is then written into the video memory 6 (steps S9 and S10) so that either of these messages can be displayed in a processor speed column (52). After providing the needed mode, the operator then presses the set-up key 5b, which allows the data processing system to execute the processes matching the entered mode. Next, in response to the interruption signal that was generated, the data processing system executes the processes shown in FIG. 3. When interruption is underway, a variety of data which has not yet been completely processed is stored in a specific area of the random access memory (RAM) to protect it against the effects of the interruption process (step N1). Next, the CPU 1 identifies whether the interruption counter shows an odd or even number (step N2). If the CPU 1 identifies that the counter shows an odd number, the CPU 1 then determines whether the slow flag is ON or OFF (step N3). If the slow flag is ON, the operation mode proceeds to step N4 to activate the WAIT process (stand-by loop). To correctly execute the WAIT process for a predetermined period of time, the CPU 1 generates an NOP (No operation) command to prevent the next step (step N4). During step N2, if the CPU 1 identifies that the counter shows an even number, the normal interruption process is completed or the CPU 1 causes the system to immediately complete the interruption process (step N5). After completing the above processes, the counter advances one unit (step N6) allowing the system to restore normal operation to reactivate the RAM registration which was left inoperative until the interruption process was completed (step N7).

Note that the preferred embodiment described above makes it possible for the CPU 1 (the microprocessor) to change the apparent data-processing speeds between two speeds, the standard and slow speeds. However, it is also possible for the system to select from more than two slow data processing speeds. For example, it is possible for the system to selectively execute a standby process for every two and/or ten interruption signals. As is clear from the above description, the present invention provides a novel data-processing device incorporating a microprocessor that functions in response to signals output by a clock oscillator. The data processing device is comprised of means for generating interruption signals at specific intervals by dividing the signals output the clock oscillator; signal input means for inputting command signals that cause the microprocessor to change the data-processing speed; and a controller which, in response to the signal from the said input means, executes the standby process each time a specific number of interruption signals generated by the signal generating means is received. As a result, the data-processing device related to the present invention can efficiently process programs designed for use with slow-speed processors at very high speed without the use of any kind of additional hardware. In addition, the system can reduce the apparent process speed, so that the operator can correctly process data in accordance with his own operating ability.

While only certain embodiments of the present invention have been described, it will be apparent to those skilled in the art that various changes and modifications may be made without departing from the spirit and scope of the present invention as claimed.

What is claimed is:

1. A data processing machine, comprising:
    a microprocessor for executing program instructions;
    oscillator means for applying clock signals to said microprocessor to control the processing speed thereof;
    interrupt means, responsive to said clock signals, for generating interrupt signals at predetermined intervals corresponding to a predetermined number of clock signals;
    signal generation means, responsive to said interrupt signals, for inputting interrupt command signals to said microprocessor, including a latch circuit receiving an interrupt signal and outputting an interrupt command signal in response thereto,
    said latch circuit further receiving an interrupt acknowledge signal from said microprocessor for resetting said latch circuit; and
    control means within said microprocessor, responsive to said interrupt command signals, for executing a standby process to change the processing speed of the microprocessor.

2. The data processing machine defined in claim 1, wherein said interrupt means comprises a division circuit for dividing the frequency of the clock signals produced by said oscillator means and generating interrupt signals corresponding to the divided frequency.

* * * * *